INVENTORS
JOHN B. MAJERUS
FLOYD M. TOTTEN
BY Moody and Harris
ATTORNEYS

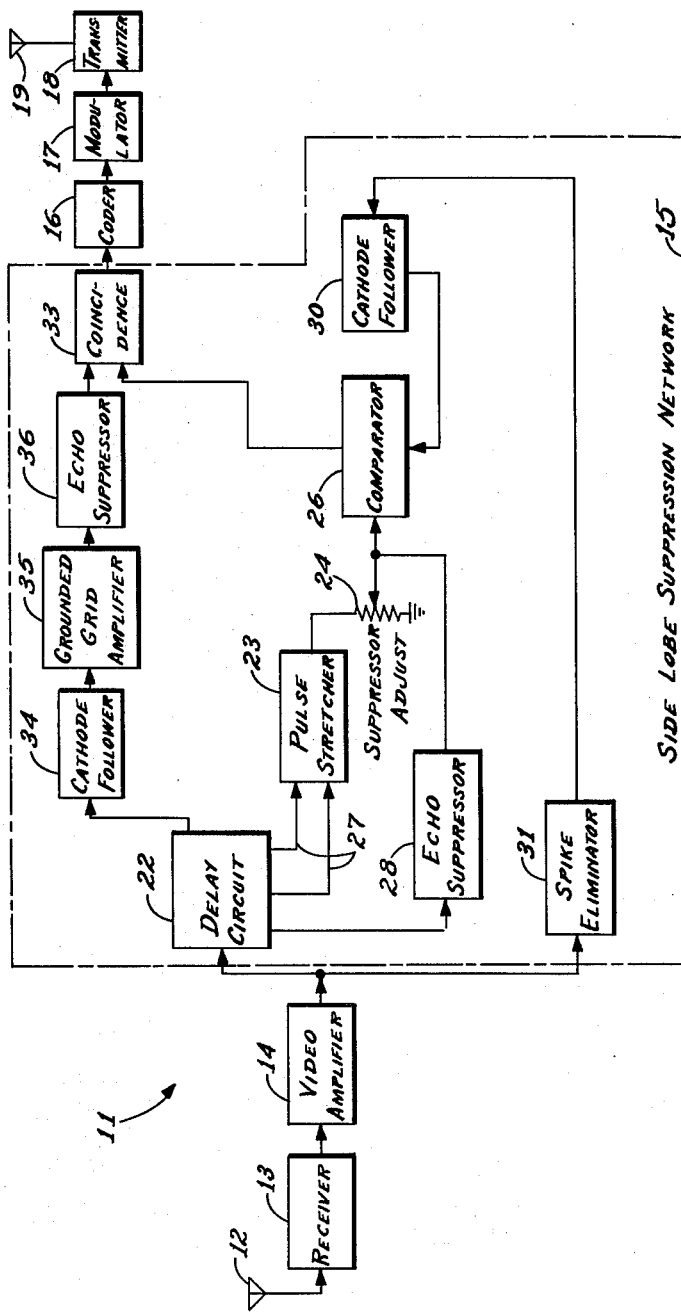

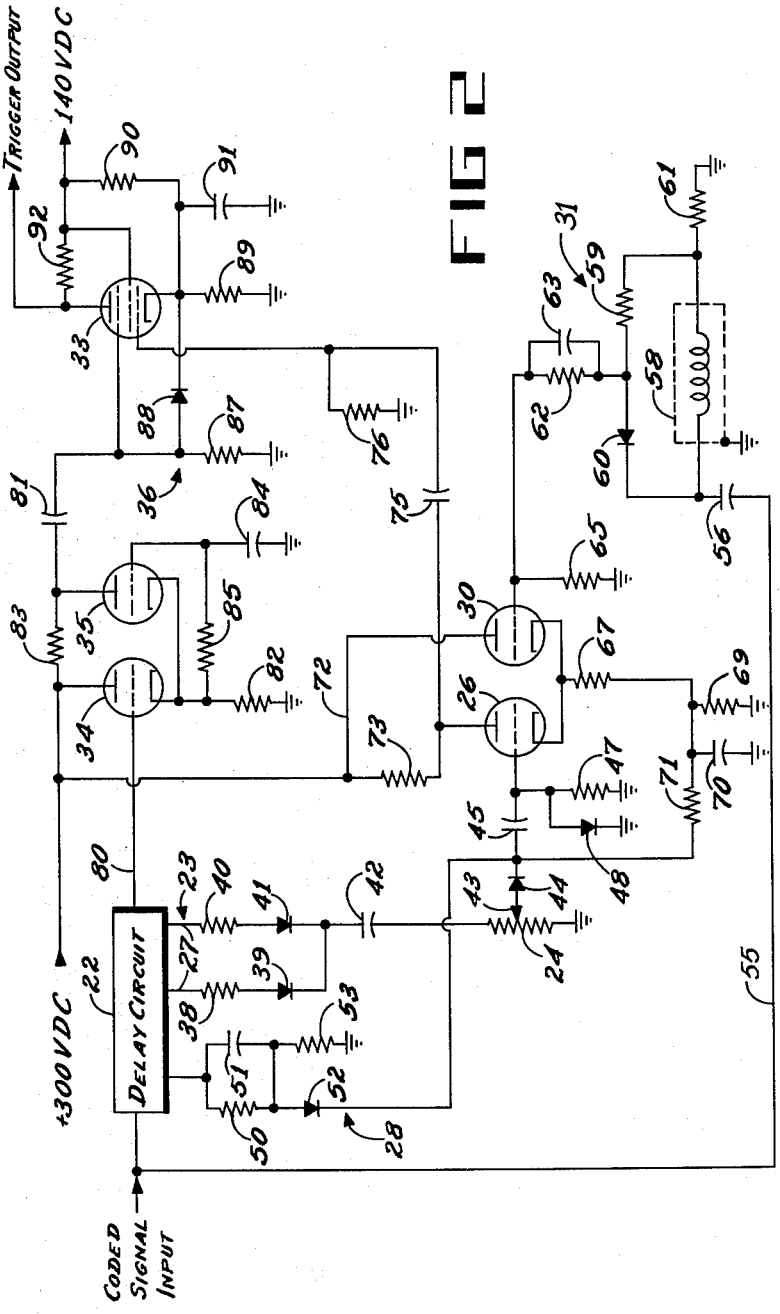

INVENTORS
JOHN B. MAJERUS
FLOYD M. TOTTEN
BY
Moody and Harris
ATTORNEYS

United States Patent Office 3,032,757
Patented May 1, 1962

3,032,757
SIDE LOBE SUPPRESSION NETWORK
John B. Majerus and Floyd M. Totten, Cedar Rapids, Iowa, assignors to Collins Radio Company, Cedar Rapids, Iowa, a corporation of Iowa
Filed June 13, 1960, Ser. No. 35,614
6 Claims. (Cl. 343—6.8)

This invention relates to a side lobe suppression network and more particularly to a network for use in a transponder or similar apparatus to receive a coded signal having either two or three pulses and to reject said coded signal if any of said pulses are from a side lobe of the primary radar antenna system.

Ordinarily, an antenna system for use with a primary radar transmitter, capable of producing a suitable coded signal to be received by a transponder, includes an omnidirectional antenna to transmit at least one control pulse and a directional antenna to transmit at least one trigger pulse. The coded signal thus transmitted may then be received by a transponder, which may be, for example, in an aircraft. If the received signal has the proper code, the transponder will then be made to transmit a return signal to the primary radar system, and, if desired, the return signal itself may be coded. As is well known in the art, such a system may be utilized for identification purposes or for deriving other information such as the altitude or bearing of the aircraft.

One major disadvantage of a transponder of this type has been that a side lobe pulse from the directional antenna of the primary radar sometimes triggered the transponder and resulted in an erroneous and undesirable response.

As is well known in the art, a side lobe pulse is, however, of much smaller amplitude than is a major lobe pulse. While this characteristic of directional antennas has been utilized heretofore in some devices of this general type to suppress side lobe pulses and thereby eliminate undesirable triggering of the transponder, such devices are normally not capable of receiving either a two pulse or a three pulse coded signal and rejecting the same if a side lobe pulse is present. In addition, it has generally been necessary heretofore that the pulses of a three pulse coded signal be equally spaced in order to achieve the desired rejection of a received signal which includes a side lobe pulse.

It is therefore an object of this invention to provide a side lobe suppression network capable of receiving either a two or a three pulse coded signal and rejecting the same if any pulse is from a side lobe of the directional antenna of the primary radar system.

More particularly, it is an object of this invention to provide a side lobe suppression network that includes means to compare the pulses of a received coded signal and thereby provide a difference output that may be applied to coincidence means to preclude an output from the network if any pulse originated from the side lobe of a directional antenna.

It is also an object of this invention to provide a relatively simple transponder side lobe suppression network having an adjustable signal reduction means to enable the operator to vary the pulse strength necessary for the received signal to trigger the transponder.

It is another object of this invention to provide a side lobe suppression network that does not require all of the pulses of a three pulse coded signal to be equispaced.

With these and other objects in view, which will become apparent to one skilled in the art as the description proceeds, this invention resides in the novel construction, combination and arrangement of parts substantially as hereinafter described and more particularly defined by the appended claims, it being understood that such changes in the precise embodiment of the herein disclosed invention may be submitted as come within the scope of the claims.

The accompanying drawings illustrate one complete example of the embodiment of the invention constructed according to the best mode so far devised for the practical application of the principles thereof, and in which:

FIGURE 1 is a block diagram illustrating a transponder utilizing the side lobe suppression network of this invention;

FIGURE 2 is a schematic diagram of the side lobe suppression network of this invention;

Figure 8:
Figure 7:
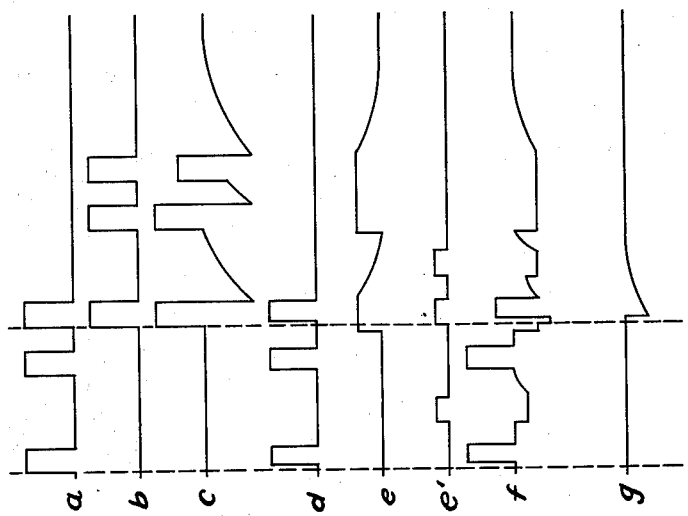

FIGURE 7 is an illustration of one possible sequence of wave forms which might be present at selected stages in the side lobe suppression network of this invention when a three pulse coded signal in which the control pulse is between the spaced trigger pulses from the main lobe of the directionally radiated antenna; and FIGURE 8 is similar to FIGURE 7 except that said trigger pulses are from a side lobe of said directionally radiated antenna.

Referring now to the drawings in which like numerals have been utilized for like characters throughout, the numeral 11 illustrates generally a transponder which includes the side lobe suppression network of this invention.

Such a transponder may include a conventional antenna 12 for receiving a coded signal from a primary radar system (not shown). The received coded signal may be passed through a receiver 13 and a video amplifier 14, both of which may be conventional, to the side lobe suppression network 15 of this invention. The output from network 15 may then be coupled to a conventional coder 16, if desired, and then through a conventional modulator 17 to a conventional transmitter 18 from where a return signal to the primary radar system may be transmitted, as through antenna 19. If desired, of course, antenna 12 may be used both for receiving the coded signal and transmitting the return signal.

As shown best in FIGURE 1, the side lobe suppression network 15 of this invention includes a tapped delay circuit 22 to which the output from video amplifier 14 may be directly coupled. Delay circuit 22 may be conventional and may include a plurality of delay lines (not shown) to provide for changing the mode of operation of the transponder if desired. Delay circuit 22 is tapped at selected locations therealong in order to delay the received coded signal a predetermined amount of time for purposes to be brought out hereinafter.

As shown in FIGURE 1, an output, delayed an amount of time substantially equal to the time interval $t$ between the transmitted pulses of a two pulse coded signal and substantially equal to the time interval $t$ between the transmitted trigger pulses of a three pulse coded signal, is taken from delay line 22 and is coupled through pulse stretcher 23 and suppression adjust 24 to a comparator 26. As shown in FIGURES 1 and 2, and as is well known in the art, a plurality of leads 27 may be provided to couple the received coded signal to pulse stretcher 23 so that a slight delay exists between each in order to obtain an output from the pulse stretcher having the proper width. An additional output from delay line 22, delayed a time interval substantially less than $t$, may also be coupled to comparator 26 in common with the output from suppressor adjust 24 through echo suppressor 28 for purposes to be brought out hereinbelow.

The coded signal from video amplifier 14 is also coupled to comparator 26 to provide a substantially undelayed input thereto through a cathode follower 30 and spike eliminator 31. A difference output from comparator 26 may then be coupled to coincidence means 33 so that an output is produced therefrom and coupled to coder 16 only when a positive pip, or pulse, is received by said coincidence means in coincidence with a second positive pip, or pulse, from still another output from delay line 22, which output is also delayed a time interval $t$. This last mentioned delayed output is coupled to coincidence means 33 through cathode follower 34, grounded grid amplifier 35 and echo suppression circuit 36.

As shown in FIGURE 2, pulse stretcher 23 may include a resistor 38 and diode 39 connected in series with one another and in parallel with serially connected resistor 40 and diode 41 so that the common output therefrom is coupled to suppression adjust 24 through a capacitor 42.

The output from suppression adjust 24, which is preferably a tapped variable resistor having its output taken from its variable tap 43, may be coupled to the control grid of comparator 26 through a diode 44 and coupling capacitor 45 to thus provide a first input thereto for comparison purposes, which input, as brought out hereinabove, is substantially delayed a time interval $t$. In addition, a D.C. resistor circuit, including resistor 47 and diode 48 connected in parallel, is also preferably provided between the grid of comparator 26 and ground.

Echo suppression circuit 28, which is also connected to the control grid of comparator tube 26 and with delay line 22, as shown in FIGURE 2, may include a resistor 50 and a capacitor 51 connected in parallel with one another and in series with diode 52. A resistor 53, connected to one end of resistor 50, provides attenuation for the coded and delayed signal coupled through diode 52. Thus echo suppression circuit 28 provides a separate path from delay circuit 22 to the control grid of comparator tube 26 from that provided by pulse stretcher 23 and suppression adjust 24. However, the magnitude of the coded signal from echo suppressor 28 is small when compared with the magnitude of the coded signal from pulse stretcher 23 and suppression adjust 24, and in addition provides an output that is delayed only a fraction of time interval $t$ so that the output from echo suppressor 28 is instrumental in the rejection of coded signals including a side lobe pulse only when the control pulse occurs between the two trigger pulses in a three pulse coded signal.

The substantially undelayed input to comparator 26 is coupled to the cathode thereof through cathode follower 30. The coded input signal may be coupled from video amplifier 14 through lead 55 and capacitor 56 to spike eliminator 31 which operates in a conventional manner and includes delay line 58, resistor 59 and diode 60, the latter two being connected in series with one another and in parallel with delay line 58. Resistor 61 is connected to the junction between resistor 59 and delay line 58 to terminate the delay line. The output from spike eliminator 31, which is delayed only slightly, is taken from the juntcion between diode 60 and resistor 59 and coupled to the grid of cathode follower 30 through an attenuation means which includes resistor 62 and frequency compensating capacitor 63 connected in parallel therewith. In addition, a D.C. grid return resistor 65 is connected between the grid of cathode follower 30 and ground.

Comparator tube 26, from which a difference output is produced, has its cathode tied in common with the cathode of cathode follower tube 30, and both are connected to ground through load resistor 67 and resistor 69, the latter of which is in parallel with by-pass capacitor 70. In addition, grid resistor 71 is also connected between the junction of resistors 67 and 69 and diode 44 to provide a D.C. return path for the diode.

To provide operating voltages for comparator tube 26 and cathode follower 30, cathode follower 30 may have its plate directly connected to a 300 volt D.C. source, as shown in FIGURE 2, by means of lead 72 while comparator 26 may be connected to said D.C. voltage source through load resistor 73.

As brought out hereinabove, the difference output from comparator 26 is coupled to coincidence means 33. As shown in FIGURE 2, this output is preferably coupled to the control grid of coincidence tube 33 by means of a coupling capacitor 75 and grid return resistor 76, the latter being connected between ground and the control grid of coincidence tube 33.

The second input to coincidence tube 33 is provided by coupling an output delayed by the time interval $t$ from delay circuit 22 by means of lead 80 to the control grid of cathode follower 34. The output from cathode follower 34 is coupled to the cathode of grounded grid amplifier 35 and an output is taken from the plate thereof and coupled to the third grid of coincidence tube 33 through capacitor 81 and echo suppressor 36.

A load is provided for cathode follower 34 by means of resistor 82 connecting the cathode to ground while operating voltages are provided to cathode follower 34 and amplifier 35 by connecting the plate of each to the 300 v. D.C. source, the plate of amplifier 35 being connected with said D.C. source through load resistor 83. The grid of amplifier 35 is grounded through capacitor 84, and also connected to the cathode of cathode follower 35 by means of grid return resistor 85.

As shown in FIGURE 2, echo suppressor 36 may include a resistor 87 one end of which is directly connected to the third grid of coincidence tube 33 and to the cathode of coincidence means 33 through diode 88, while the other end of said resistor is connected to ground.

A voltage divider network which includes serially connected resistors 89 and 90 is connected between a 140 v. D.C. power supply and ground. A by-pass capacitor 91 may be connected in parallel with resistor 89. The cathode of coincidence tube 33 is connected to the junction between resistors 89 and 90 to bias said tube. The 140 v. D.C. voltage supply may be directly connected to the second grid of coincidence tube 33 while the plate may be connected thereto through load resistor 92.

In operation, if a two pulse coded signal is being transmitted by a primary radar or interrogator system, one of which is a control pulse from an omnidirectional antenna and the other of which is a trigger pulse from a directional antenna, the main lobe pulse from said directional antenna will commonly be caused to have substantially the same magnitude as that of the control pulse and will follow the control pulse by a time interval $t$ between the transmitted pulses. This incoming coded signal will be coupled to side lobe suppression network 15 through antenna 12, receiver 13 and video amplifier 14 and may have a wave form when coupled to suppression network 15 as shown in $a$ of FIGURE 3 when the trigger pulse is from a main lobe of the directional antenna. If the received coded signal is from a side lobe of the directional antenna, however, the signal may have a wave form as shown in $a$ of FIGURE 4. In either case, this coded signal will be delayed in delay line 22 for a time interval $t$, which time interval is controlled by the desired delay mode selected. The time interval $t$ will be, for example, eight microseconds if the transmitted pulses of a two pulse coded signal are spaced eight microseconds or if the transmitted trigger pulses of a three pulse coded signal are spaced eight microseconds.

Figure 4:
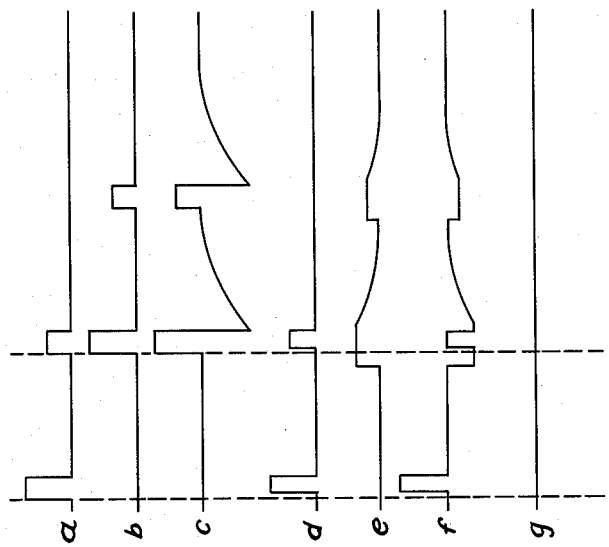
FIGURE 4 is similar to FIGURE 3 except that said one pulse is from a side lobe of said directionally radiated antenna.
Figure 3:
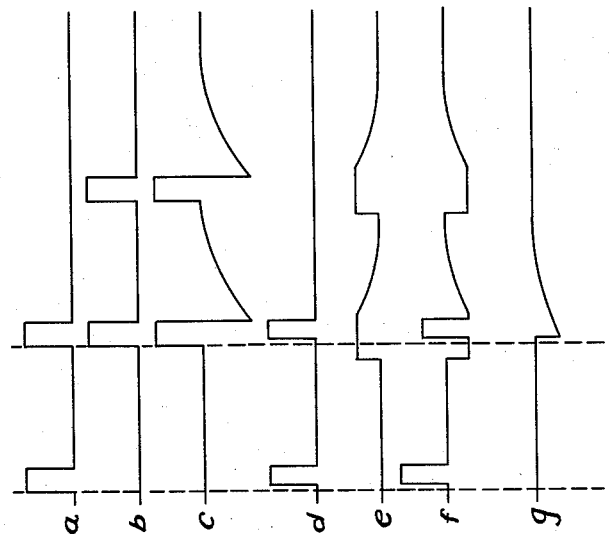
FIGURE 3 is an illustration of one possible sequence of wave forms which might be present at selected stages in the side lobe suppression network of this invention when a two pulse coded signal is received, one of said pulses being from the main lobe of a directionally radiated antenna and the other said pulse being from an omnidirectional antenna.

This delayed output from delay line 22, as shown in $b$ of FIGURES 3 and 4, is coupled to coincidence means 33 through cathode follower 34, grounded grid amplifier 35 and echo suppressor circuit 36, so that the coupled signal, which is shown in $c$ of FIGURES 3 and 4, is delayed no further in passing through these elements. Echo suppressor circuit 36, however, causes a negative swing, or ditch, immediately following each pulse of the coded signal, said ditch being proportional to the magnitude of the pulse, as shown in $c$ of FIGURES 3 and 4.

The output from delay line 22 coupled to pulse stretcher 23 is adjustably attenuated by suppressor adjust 24 so that the input to comparator 26, as shown by $e$ of FIGURES 3 and 4, is smaller in magnitude than the originally received signal. As previously brought out, the output to comparator 26 from echo suppressor 28 need not be considered when a two pulse coded signal is received.

A second input is coupled to comparator 26 by applying the input signal through spike eliminator 31 and cathode follower 30 to the cathode of comparator 26. This coded signal, as shown in $d$ of FIGURES 3 and 4, is delayed only slightly in passing through spike eliminator 31. Since the output from suppressor adjust 24 is coupled to the grid of comparator tube 26 and the output from cathode follower 30 is coupled to the cathode of comparator tube 26, the difference between these signals is produced at the output of the comparator tube, as shown in $f$ of FIGURES 3 and 4.

To produce an output from the suppression network 15 two positive pips or pulses must be coupled to the grids of coincidence tube 33 in coincidence in order to produce an output at the plate thereof. As shown in FIGURE 3, when the output from comparator 26 ($f$ of FIGURE 3) and the output from grounded grid amplifier 35 and echo suppressor 36 ($c$ of FIGURE 3) are coupled to coincidence tube 33, it is obvious that an output (shown by $g$ of FIGURE 3) will be produced at the plate of coincidence tube 33 since the two inputs thereto have coincident positive pulses.

As shown in FIGURE 4, however, there is no output from suppression network 15 when a side lobe pulse is received since the inputs to coincidence tube 33 (as shown by $c$ and $f$ of FIGURE 4) never have coincident positive pulses. This is due to the relatively small magnitude of the side lobe, which when compared to the control pulse, is insufficient to produce a positive output pulse. As can readily be seen from the wave forms $c$ and $f$ of FIGURE 4, there can, in fact, at no time be a positive pip of one that is coincident with a positive pip of the other. Hence no output will be produced from suppressor network 15 as shown by $g$ of FIGURE 4.

It is to be appreciated, of course, that suppressor adjust 24 can be adjusted to vary the magnitude of the delayed input to comparator tube 26 and thereby control the rejection level of the trigger pulse so that, for example, if the control pulse exceeds the trigger pulse or pulses by as much as 10 decibels, then the suppression network of this invention will reject the coded signal.

If a three pulse system is used, two of these pulses are from the directional antenna and hence are trigger pulses while only one need be from an omnidirectional antenna since only one control pulse is necessary.

It is another feature of this invention that when using a three pulse system the control pulse need not be spaced a distance equal to the distance between the two trigger pulses and, in fact, is closely adjacent to one or the other trigger pulse.

Figure 6:
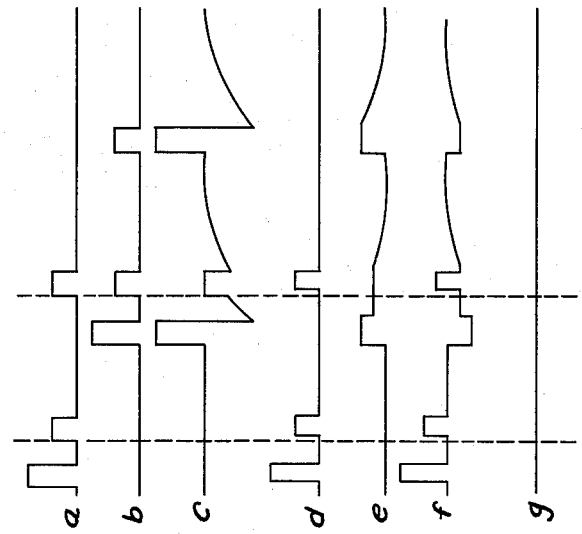
FIGURE 6 is similar to FIGURE 5 except that said trigger pulses are from a side lobe of said directionally radiated antenna.
Figure 5:
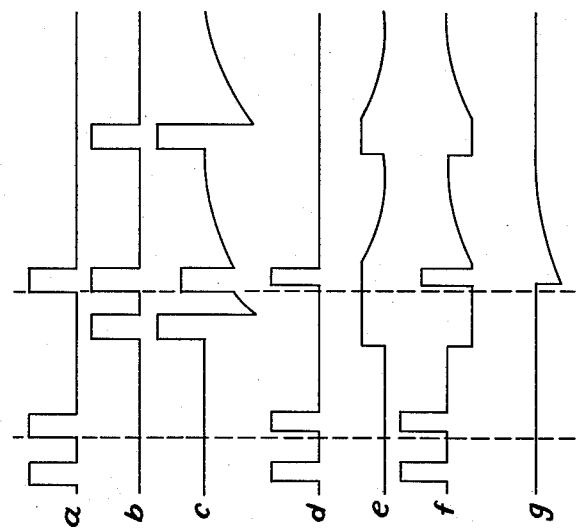
FIGURE 5 is an illustration of one possible sequence of wave forms which might be present at selected stages in the side lobe suppression network of this invention when a three pulse coded signal is received, said coded signal having a control pulse closely preceding the first of two directionally radiated spaced trigger pulses from a main lobe of a directionally radiated antenna.

As shown in FIGURES 5 and 6 the control pulse precedes the trigger pulses which, as shown in FIGURE 5, may be from a main lobe or, as shown in FIGURE 6, may originate from a side lobe of the directional antenna of the interrogator. In the former case, of course, the suppressor circuit of this invention will produce an output while in the latter the coded signal will be suppressed so that no output will be produced.

As shown in $a$ of FIGURE 5, if the incoming trigger pulses are from a main lobe, they will have substantially the same magnitude as the control pulse. If from a side lobe, however, the trigger pulses will have substantially less magnitude than the control pulse, as shown in $a$ of FIGURE 6. The trigger pulses are spaced a time interval $t$, as shown in $a$ of FIGURES 5 and 6, which interval is the same as the spacing between the two pulses of a two pulse coded signal. Thus a first trigger pulse, delayed a time interval $t$ (as shown by $b$ of FIGURES 5 and 6) and of somewhat reduced magnitude due to the ditching caused by the closely preceding control pulse (as shown by $c$ of FIGURE 5), is coupled to coincidence tube 33. As shown in $c$ of FIGURE 6, however, this ditching effect caused by the control pulse will cause the first trigger pulse from a side lobe to lack a positive portion.

The incoming coded signal is also coupled substantially undelayed to the cathode of comparator 26 as shown in $d$ of FIGURES 5 and 6. The second, or delayed, input to comparator 26 is shown by $e$ of FIGURES 5 and 6 to comprise the stretched and attenuated signal from suppressor adjust 24, and, as shown, the control pulse and first trigger pulse have been combined by pulse stretcher 23. The output from comparator 26 will consist of the difference between wave forms $d$ and $e$ as shown in $f$ of FIGURES 5 and 6. Although a positive pip difference output is provided when the pulses are compared regardless of whether the trigger pulses are from a main lobe or a side lobe, an output is precluded from the suppression network, as shown by $g$ of FIGURES 5 and 6, except when the trigger pulses are from a main lobe since the needed coincident positive pulse to be applied to coincidence tube 33 from amplifier 35 and the suppressor 36 occurs only when the trigger pulses are from a main lobe.

As shown in FIGURES 7 and 8, the control pulse may be transmitted between the two trigger pulses. As shown in FIGURE 7, when trigger pulses from a main lobe are received, an output will be provided from network 15 while, as shown in FIGURE 8, if the received trigger pulses are from a side lobe, no output will be produced from the suppression network of this invention.

As shown in $a$ of FIGURES 7 and 8, an incoming coded signal, having a pair of trigger pulses with a control pulse slightly preceding the second trigger pulse, will be delayed by delay circuit 22 a time interval $t$, as shown by $b$ of FIGURES 7 and 8, so that when applied to coincidence tube 33 the coded signal will have a wave form as shown in $c$ of each figure.

As shown in FIGURES 7 and 8, an undelayed coded signal (shown by $d$) and a delayed coded signal (shown by $e$) are applied to comparator 26. In addition the output from echo suppressor 28 must now be considered. This output is necessarily delayed an amount of time equal to the time interval between the control pulse and the adjacent trigger pulse plus the time duration of the control pulse itself. This output, which is shown by $e'$ of FIGURES 7 and 8, is coupled to comparator 26 in common with the output from suppressor adjust 24. As shown in $e'$ of FIGURES 7 and 8, the control pulse is therefore coincident with both the first trigger pulse (from suppressor adjust 24) and with the second trigger pulse (from cathode follower 30).

As shown in $f$ of FIGURE 7, the difference output from comparator 26 will still be positive, though reduced by the attenuated signal from echo suppressor 28, and an output, as shown in g of FIGURE 7, will therefore be produced from coincidence tube 33. However, as shown in f of FIGURE 8, when the trigger pulses are from a side lobe, the difference output from comparator 26 will not be positive due to the combination of the outputs from suppressor adjust 24 and echo suppressor 28 the sum of which will be at least equal to the magnitude of the trigger pulse from a side lobe. Thus, as shown by g of FIGURE 8, no output is produced when a side lobe trigger pulse is received.

In view of the foregoing it will be readily apparent to those skilled in the art that the side lobe suppression network of this invention provides a side lobe suppression network capable of receiving either a two pulse or a three pulse coded signal and rejecting said signal if the trigger pulse or pulses therein originated from a side lobe of a directional antenna.

What is claimed as our invention is:

1. A side lobe suppression network for receiving a coded signal having a control pulse and at least one directionally radiated pulse spaced a fixed time interval from another pulse of said coded signal, said side lobe suppression network comprising: delay means for receiving said coded signal and delaying the same so as to provide at least a pair of outputs, one of which is delayed for a period of time substantially equal to said fixed time interval and the other of which is delayed for a period of time substantially less than said fixed time interval; comparison means for receiving said delayed coded signals from said pair of outputs and said coded signal substantially undelayed to thereby effect comparison of the magnitudes of the pulses of said coded signal, the output from said comparison means being the difference between said substantially undelayed coded signal and the sum of said delayed signals; and coincidence means for receiving the coded signal from said delay means delayed said time interval and the difference output from said comparison means to permit an output pulse from said side lobe suppression network only when said directionally radiated pulse is from a main lobe.

2. A side lobe suppression network for receiving a coded signal having a control pulse and at least one directionally radiated trigger pulse spaced a fixed time interval from another pulse of said coded signal, said side lobe suppression network comprising: delay means for receiving said coded signal and delaying the same so as to provide at least a pair of outputs, the first of which is delayed for a period of time substantially equal to said fixed time interval and the second of which is delayed for a period of time substantially less than said fixed time interval; adjustable signal attenuation means connected to the first output of said delay means to receive said delayed signal and adjustably control the magnitude of the same; comparison means for receiving said coded signal substantially undelayed and for receiving said delayed signals from said signal attenuation means and said second output to thereby enable comparison of the magnitude of the pulses of said coded signal, the output from said comparison means being the difference between the coded signal and the sum of the same signal as delayed; and coincidence means connected with said first output of said delay means for receiving said coded signal delayed said fixed time interval and connected with said comparison means for receiving the difference output therefrom to preclude an output pulse from said side lobe suppression network when the coded signal includes a directionally radiated trigger pulse from a side lobe.

3. In a transponder for receiving a coded signal having a directionally radiated trigger pulse and a non-directionally radiated control pulse spaced a predetermined time interval from and preceeding said trigger pulse, a side lobe suppression network, comprising: delay means for receiving said coded signal and delaying the same an amount of time equal to the time interval between said pulses; adjustable signal attenuation means connected to said delay means for controlling the magnitude of said delayed pulses; differential amplifying means for receiving the delayed signal from said signal attenuation means and said coded signal substantially undelayed to compare the magnitude of said trigger pulse and said attenuated control pulse and produce an output therefrom that is proportional to the difference between said compared pulses; and coincidence means for receiving the difference output from said comparison means and the delayed signal from said delay means to preclude an output from said side lobe suppression network when said trigger pulse is smaller in magnitude then said attenuated control pulse whereby a coded signal having a trigger pulse from a side lobe of a directionally radiating antenna is rejected by said side lobe suppression network.

4. In a transponder for receiving a coded signal having a pair of directionally radiated trigger pulses spaced by a predetermined time interval and a non-directionally radiated control pulse spaced from one said trigger pulse a predetermined time interval substantially less than the spacing between said trigger pulses, a side lobe suppression network, comprising: delay means for receiving said coded signal and having a pair of outputs, the first of which provides said coded signal delayed an amount of time substantially equal to said time interval between said trigger pulses, and the second of which provides said coded signal delayed an amount of time equal to the time interval between said control pulse and said one trigger pulse plus the time interval of the control pulse itself; comparison means for receiving the delayed outputs from said delay means and said coded signal substantially undelayed to compare the same, the output from said comparison means being the difference between said undelayed signal and the sum of said delayed signals; and coincidence means for receiving the output from said comparison means and the delayed signal from the first output of said delay means to preclude an output from said side lobe suppression network when said trigger pulses are smaller in magnitude by a predetermined amount than said control pulse whereby a coded signal having trigger pulses from the side lobe of a directionally radiating antenna is rejected by said side lobe suppression network.

5. In a transponder for receiving a coded signal having a control pulse and at least one directionally radiated pulse, a side lobe suppression network, comprising: delay means for receiving said coded signal and delaying the same for a predetermined interval of time; differential amplifying means having a pair of inputs and an output, one said input being connected to said delay means for receiving said delayed coded signal; means for coupling said coded signal substantially undelayed to the other input of said differential amplifying means; coincidence means having a pair of inputs and an output; means connecting one input of said coincidence means with said output of said differential amplifying means for coupling the difference output therefrom to said coincidence means; and means connected between the other input of said coincidence means and said delay means to couple said delayed coded signal from said delay means to said coincidence means whereby said coincidence means precludes an output from said side lobe suppression network whenever the received coded signal includes a directionally radiated pulse from a side lobe.

6. A side lobe suppression network, comprising: a delay line having an input, to which may be applied a received coded signal having a non-directionally radiated control pulse and at least one directionally radiated trigger pulse spaced a predetermined time interval from another pulse of said coded signal, and at least a pair of outputs the first of which provides a signal delayed said predetermined time interval and the second of which provides a signal delayed a time interval substantially less than said predetermined time interval; a variable resistor having a variable tap and one end connected to the first output of said delay line; echo suppression means having an input connected to the second output of said delay line and an output; spike elimination means for receiving said coded signal; a first vacuum tube having its control grid connected to the variable tap of said variable resistor and to the output of said echo suppression means and its cathode connected to said spike elimination means; a second vacuum tube having a pair of grids; means for coupling the output from the plate of said first vacuum tube to one grid of said second vacuum tube; and means for connecting the first output of said delay line to the other grid of said second vacuum tube whereby said second vacuum tube conducts only when said received coded signal includes a trigger pulse from the main lobe of a directionally radiating antenna.

References Cited in the file of this patent

UNITED STATES PATENTS 2,800,651    Marshall _____ July 23, 1957